(12) United States Patent
Wang et al.

(10) Patent No.: US 9,666,908 B2
(45) Date of Patent: *May 30, 2017

(54) LITHIUM ION BATTERY

(71) Applicants: Jia-Ping Wang, Beijing (CN); Shou-Shan Fan, Beijing (CN)

(72) Inventors: Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/628,237

(22) Filed: Sep. 27, 2012

(65) Prior Publication Data

US 2014/0017562 A1    Jan. 16, 2014

(30) Foreign Application Priority Data

Jul. 13, 2012 (CN) .......................... 2012 1 0242375

(51) Int. Cl.
| | | |
|---|---|---|
| *H01M 10/0585* | (2010.01) | |
| *H01M 4/62* | (2006.01) | |
| *H01M 4/66* | (2006.01) | |
| *H01M 10/04* | (2006.01) | |
| *H01M 10/052* | (2010.01) | |

(52) U.S. Cl.
CPC ....... *H01M 10/0585* (2013.01); *H01M 4/625* (2013.01); *H01M 4/661* (2013.01); *H01M 4/663* (2013.01); *H01M 4/667* (2013.01); *H01M 10/04* (2013.01); *H01M 10/052* (2013.01)

(58) Field of Classification Search
CPC ...... H01M 4/663; H01M 4/625; H01M 4/661; H01M 4/667; H01M 10/04; H01M 10/052; H01M 10/0585
USPC ........................................................ 429/211
See application file for complete search history.

(56) References Cited

U.S. PATENT DOCUMENTS

| | | | |
|---|---|---|---|
| 2009/0061312 A1* | 3/2009 | Zhamu et al. ................ 429/217 |
| 2010/0323246 A1 | 12/2010 | Feng et al. | |
| 2011/0171371 A1* | 7/2011 | Li et al. ......................... 427/122 |
| 2011/0212359 A1* | 9/2011 | Dai et al. ...................... 429/149 |
| 2011/0256451 A1* | 10/2011 | Cui et al. .................. 429/218.1 |

(Continued)

FOREIGN PATENT DOCUMENTS

| | | |
|---|---|---|
| CN | 101420021 | 4/2009 |
| TW | 201212353 | 3/2012 |
| TW | 201225398 | 6/2012 |

OTHER PUBLICATIONS

Marschilok, A. et al., "Carbon Nanotube Substrate Electrodes for Lightweight, Long-life Rechargeable Batteries", Published online Jul. 11, 2011, Energy Environ. Sci., 2011, 4, 2943-2951, Retrieved Apr. 2, 2013.*

(Continued)

*Primary Examiner* — Nicholas P D'Aniello
(74) *Attorney, Agent, or Firm* — Steven Reiss

(57) ABSTRACT

A lithium ion battery includes at least one battery cell. The battery cell includes a cathode electrode, an anode electrode, and a separator. The separator is sandwiched between the cathode electrode and the anode electrode. At least one of the cathode electrode and the anode electrode includes a current collector. The current collector is a graphene layer.

18 Claims, 5 Drawing Sheets

(56) References Cited

U.S. PATENT DOCUMENTS

2012/0052387 A1    3/2012  Sung
2012/0192931 A1*   8/2012  Jeon et al. ............. B82Y 30/00
                                                        136/252
2013/0095389 A1*   4/2013  Bhardwaj et al. ............ 429/322

OTHER PUBLICATIONS

Flexible energy storage devices based on grapheme paper, Hyeokjo Gwon et al. Energy Environ. Sci., vol. 4, 2011, pp. 1277-1283.
Thin, Flexible Secondary Li-Ion Paper Batteries,Liangbing Hu et al., Acs Nano,vol. 4,Nov. 10, pp. 5843-5848.

* cited by examiner

LITHIUM ION BATTERY

RELATED APPLICATIONS

This application claims all benefits accruing under 35 U.S.C. §119 from China Patent Application No. 201210242375.X, filed on Jul. 13, 2012, in the China Intellectual Property Office, the disclosure of which is incorporated herein by reference. The application is also related to copending application Ser. No. 13/662,718 entitled, "METHOD FOR MAKING LITHIUM ION BATTERY", filed Oct. 29, 2012; Ser. No. 13/662,727 "LITHIUM ION BATTERY", filed Oct. 29, 2012; Ser. No. 13/662,768 "METHOD FOR MAKING LITHIUM ION BATTERY ELECTRODE", filed Oct. 29, 2012; Ser. No. 13/676,426 "LITHIUM ION BATTERY ELECTRODE", filed Nov. 14, 2012; Ser. No. 13/630,004 "METHOD FOR MAKING LITHIUM ION BATTERY", filed Sep. 28, 2012; Ser. No. 13/685,802 "THIN FILM LITHIUM ION BATTERY", filed Nov. 27, 2012; Ser. No. 13/685,803 "METHOD FOR MAKING THIN FILM LITHIUM ION BATTERY", filed Nov. 27, 2012.

BACKGROUND

1. Technical Field

The present disclosure relates to lithium ion batteries.

2. Description of Related Art

A lithium ion battery includes a case, an anode, a cathode, a non-aqueous electrolyte, and a separator. The anode, cathode, non-aqueous electrolyte, and separator are encapsulated in the case. The separator is located between the anode and the cathode. The anode, cathode, and separator are infiltrated by the non-aqueous electrolyte. The cathode includes a cathode current collector and a cathode material layer disposed on a surface of the cathode current collector. The anode includes an anode current collector and an anode material layer disposed on a surface of the anode current collector.

The current collector is used to collect the charge generated by the lithium ion battery during discharge, and to connect to an external power source during the recharging of the lithium ion battery. The current collectors are usually made of metal foils, such as copper foil and aluminum foil. However, the metal foils have a relatively large weight. The power density is calculated by power/weight. Therefore, a large weight of the current collector will decrease the power density of a lithium ion battery. Furthermore, the metal foils may be corroded by the electrolyte, which decreases the life span of the lithium ion battery.

What is needed, therefore, is to provide a lithium ion battery having high power density and long life.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
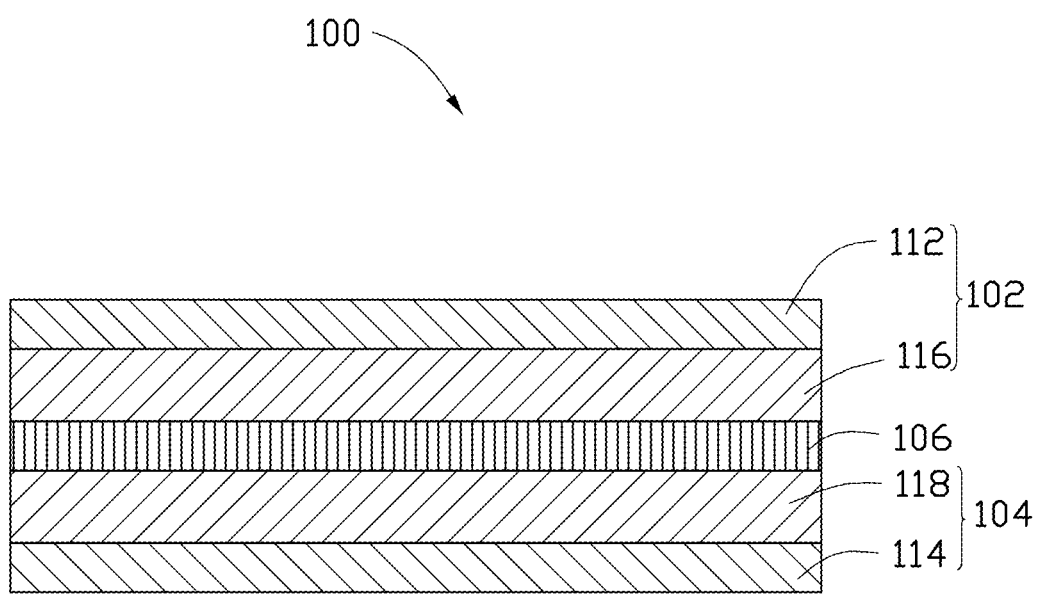
FIG. 1 is a schematic side view of an embodiment of a lithium ion battery.

Referring to FIG. 1, an embodiment of a lithium ion battery 100 includes a cathode electrode 102, an anode electrode 104, a separator 106, an electrolyte solution, and an external encapsulating shell (not shown). The cathode electrode 102, the anode electrode 104, the separator 106, and the electrolyte solution are encapsulated in the encapsulating shell. The cathode electrode 102 and the anode electrode 104 are stacked with each other and sandwich the separator 106. The cathode electrode 102 and the anode electrode 104 can be in contact with the separator 106. The cathode electrode 102, the separator 106, and the anode electrode 104 form a battery cell. The lithium ion battery 100 includes at least one battery cell. If the lithium ion battery 100 includes a plurality of battery cells that are stacked together, adjacent battery cells are separated by a separator 106. In the embodiment according to FIG. 1, the lithium ion battery 100 includes one battery cell.

The cathode electrode 102 includes a cathode current collector 112 and a cathode material layer 116 disposed on at least one surface of the cathode current collector 112. The cathode current collector 112 and the cathode material layer 116 can be two separate layers. The anode electrode 104 includes an anode current collector 114 and an anode material layer 118 disposed on at least one surface of the anode current collector 114. The anode current collector 114 and the anode material layer 118 can be two separate layers. In one embodiment, the cathode electrode 102 includes two cathode material layers 116 and one cathode current collector 112 sandwiched between the two cathode material layers 116, and the anode electrode 104 includes two anode material layers 118 and one anode current collector 114 sandwiched between the two anode material layers 118. If the lithium ion battery 100 includes a plurality of battery cells, in every two adjacent battery cells, the cathode material layer 116 in one battery cell and the anode material layer 118 in the other battery cell face each other and sandwich the separator 106 therebetween.

The cathode electrode 102 can further include a cathode conducting tab (not shown) electrically connected with the cathode current collector 112. The anode electrode 104 can further include an anode conducting tab electrically connected with the anode current collector 114. A material of the cathode conducting tab or the anode conducting tab can be metal. After the cathode conducting tab electrically connects with the cathode current collector 112 or the anode conducting tab electrically connects with the anode current collector 114, a protecting layer can be coated on surfaces of the cathode conducting tab or the anode conducting tab to protect the cathode conducting tab or the anode conducting tab from being corroded by the electrolyte solution. A material of the protecting layer can be a polymer. The cathode conducting tab or the anode conducting tab is configured to connect the cathode current collector 112 or the anode current collector 114 to outside of the lithium ion battery 100.

At least one of the cathode current collector 112 and the anode current collector 114 is a graphene layer. When the cathode current collector 112 is the graphene layer, the anode current collector 114 can be a graphene layer, a carbon nanotube layer, or a metallic film. The carbon nanotube layer can include a plurality of carbon nanotubes joined with each other by van der Waals attractive force. In one embodiment, both the cathode current collector 112 and the anode current collector 114 are graphene layers. A thickness of the graphene layer can be less than 10 micrometers. In some embodiments, the thickness of the graphene layer is in a range from about 10 nanometers to about 200 nanometers. The graphene layer includes at least one graphene. The graphene is a one-atom-thick planar sheet of $sp^2$-bonded carbon atoms that are densely packed in a honeycomb crystal lattice. The size of the graphene can be very large (e.g., several millimeters). However, the size of the graphene is generally less than 10 microns (e.g., 1 micron). In one embodiment, the graphene layer is a pure structure of graphene. The graphene layer can be or include a single graphene or a plurality of graphenes. In one embodiment, the graphene layer includes a plurality of graphenes stacked with each other or located side by side. The plurality of graphenes is combined with each other by van der Waals attractive force. The graphene layer can be a continuous integrated structure. The term "continuous integrated structure" includes, but is not limited to a structure that is combined by a plurality of chemical covalent bonds (e.g., $sp^2$ bonds, $sp^1$ bonds, or $sp^3$ bonds) to form an overall structure. A thickness of the graphene layer can be less than 1 millimeter. The graphene layer can be a free-standing structure. The term "free-standing structure" includes, but is not limited to, a structure that does not have to be supported by a substrate. For example, a free-standing structure can sustain the weight of itself when it is hoisted by a portion thereof without any significant damage to its structural integrity.

The cathode material layer 116 can include cathode active material, conductive agent, and adhesive. The cathode active material can be lithium manganate ($LiMn_2O_4$), lithium cobalt oxide ($LiCoO_2$), lithium nickel oxide ($LiNiO_2$) or lithium iron phosphate ($LiFePO_4$). The conductive agent can be acetylene black, carbon fiber, or carbon nanotube. The adhesive can be polyvinylidene fluoride (PVDF) or polytetrafluoroethylene (PTFE). A thickness of the cathode material layer 116 can be in a range from about 100 micrometers to about 300 micrometers. In one embodiment, the thickness of the cathode material layer 116 is about 200 micrometers.

Figure 2:
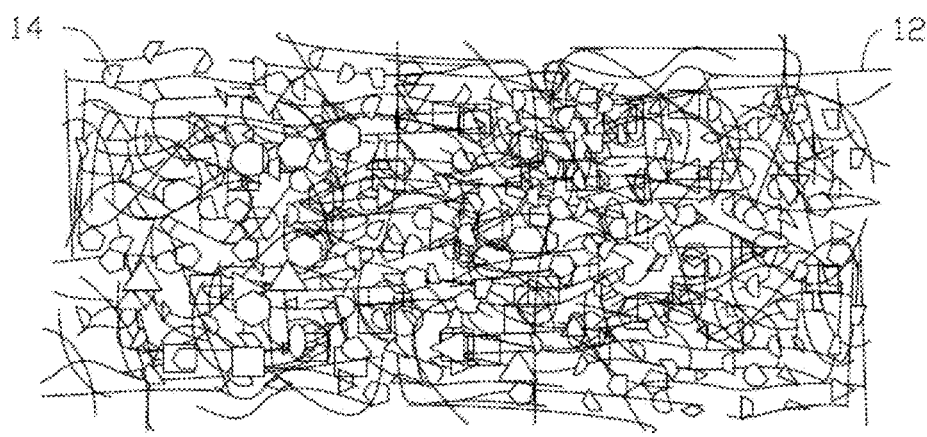
FIG. 2 is a structural schematic view of a lithium ion battery cathode.
Figure 3:
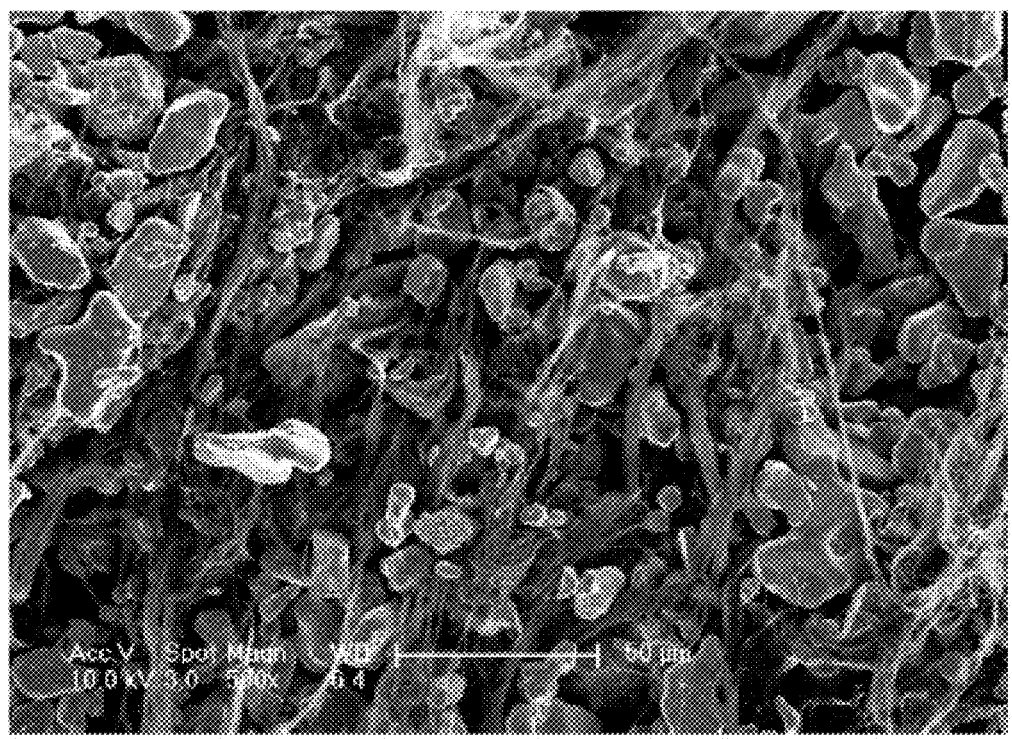
FIG. 3 is an SEM image of one embodiment of a lithium ion battery cathode.

In another embodiment, the cathode material layer 116 includes cathode active material and carbon nanotubes, e.g., the cathode material layer 116 is free of adhesive. The cathode material layer 116 can further include acetylene black, carbon fiber, or any other conductive agent. In the embodiment according to FIGS. 2 and 3, the cathode material layer 116 only includes cathode active material particles 14 and carbon nanotubes 12. A shape of the cathode active material particles 14 is not limited, and can be irregular or regular. A diameter of the cathode active material particles 14 is not limited, and can be less than 15 micrometers. In one embodiment, the cathode active material particles 14 can be lithium cobalt oxide particles having a diameter less than 15 micrometers. The carbon nanotubes 12 are entangled with each other and combined by van der Waals attractive force therebetween, thereby forming an integral continuous net structure having a plurality of micropores defined by the carbon nanotubes 12. The plurality of cathode active material particles 14 are dispersed in the net structure and attached on the surface of the carbon nanotubes 12. The carbon nanotube 12 is substantially pure, and has no impurities adhered thereon. The carbon nanotubes 12 in the lithium ion battery cathode 102 can serve as a conductive material and microporous carrier to support and fix the cathode active material particles 14. Thus, even without using an adhesive, the lithium ion battery cathode 102 can be an integrative stable structure due to the net structure composed of the carbon nanotubes 12. The cathode active material particles 14 are uniformly distributed in the net structure. Specifically, the cathode active material particles 14 can be adhered on or entangled by the carbon nanotubes, or the cathode active material particles 14 can be wrapped by the carbon nanotubes. The cathode active material particles 14 and the carbon nanotubes are in contact with each other without adhesive therebetween. The cathode active material particles 14 and the carbon nanotubes are fixed together by van der Waals attractive force therebetween. A length of the carbon nanotubes can be longer than 200 micrometers, and the carbon nanotubes can be entangled with each other to form the net structure. As such, the cathode active material particles 14 can be fixed by the net structure, and the cathode material layer 116 can be free of adhesive.

The anode material layer 118 can include anode active material, conductive agent, and adhesive. The anode active material can be natural graphite, pyrolysis carbon, or mesocarbon microbeads (MCMB). The conductive agent can be acetylene black, carbon fiber, or carbon nanotube. The adhesive can be PVDF or PTFE. A thickness of the anode material layer 118 can be in a range from about 50 micrometers to about 200 micrometers. In one embodiment, the thickness of the anode material layer 118 is about 100 micrometers.

In another embodiment, the anode material layer 118 includes anode active material and carbon nanotubes, e.g., the anode material layer 118 is free of adhesive. The anode material layer 118 can further include acetylene black, carbon fiber, or any other conductive agent. In one embodiment, the anode material layer 116 only includes anode active material particles and carbon nanotubes. A shape of the anode active material particles is not limited, and can be irregular or regular. A diameter of the anode active material particles is not limited, and can be less than 15 micrometers. The carbon nanotubes are entangled with each other and combined by van der Waals attractive force therebetween, thereby forming an integral continuous net structure having a plurality of micropores defined by the carbon nanotubes. The plurality of anode active material particles are dispersed in the net like structure and attached on the surface of the carbon nanotubes. The anode active material particles are uniformly distributed in the net structure. Specifically, the anode active material particles can be adhered on or entangled by the carbon nanotubes, or the anode active material particles can be wrapped by the carbon nanotubes. Thus, even without using adhesive, the anode material layer 118 can be an integrative stable structure due to the net structure composed of the carbon nanotubes, and the anode material layer 116 is free of adhesive.

The separator 106 can be similar to a conventional separator, such as a microporous polymer film, a microporous ceramic film, or combination thereof. A thickness of the separator 106 can be in a range from about 5 micrometers to about 60 micrometers. In some embodiments, the thickness of the separator 106 is in a range from about 15 micrometers to about 40 micrometers. The separator 106 includes a number of pores. A porous rate of the separator 106 can be in a range from about 20% to about 90%, diameters of the pores of the separator 106 is in a range from about 0.1 micrometer to about 80 micrometers. In some embodiments, the porous rate is in a range from about 40% to 80%, diameter is in a range from about 0.1 micrometer to about 10 micrometers. The electrolyte solution can include an electrolyte and an organic solvent. The electrolyte can be lithium hexafluorophosphate ($LiPF_6$), lithium terafluoroborate ($LiBF_4$), lithium bis(oxalato)borate (LiBOB), or combinations thereof. The organic solvent can be ethylene carbonate (EC), diethyl carbonate (DEC), dimethyl carbonate (DMC), ethylmethyl carbonate (EMC), propylene carbonate (PC), or combinations thereof.

The external encapsulating shell can be a rigid battery shell or a soft encapsulating bag. The conductive tabs are exposed to outside of the external encapsulating shell, thereby connecting the external circuit.

The graphene layer used as the cathode current collector 112 and/or the anode current collector 114, has relatively good conductivity, stable chemical and electrical stability, and low weight. Therefore, the cathode current collector 112 and/or the anode current collector 114 can have a low weight, and the current collector does not corrode easily, and thus has a relatively long lifespan. As such, the lithium ion battery 100 has a high power density and long lifespan.

Figure 4:
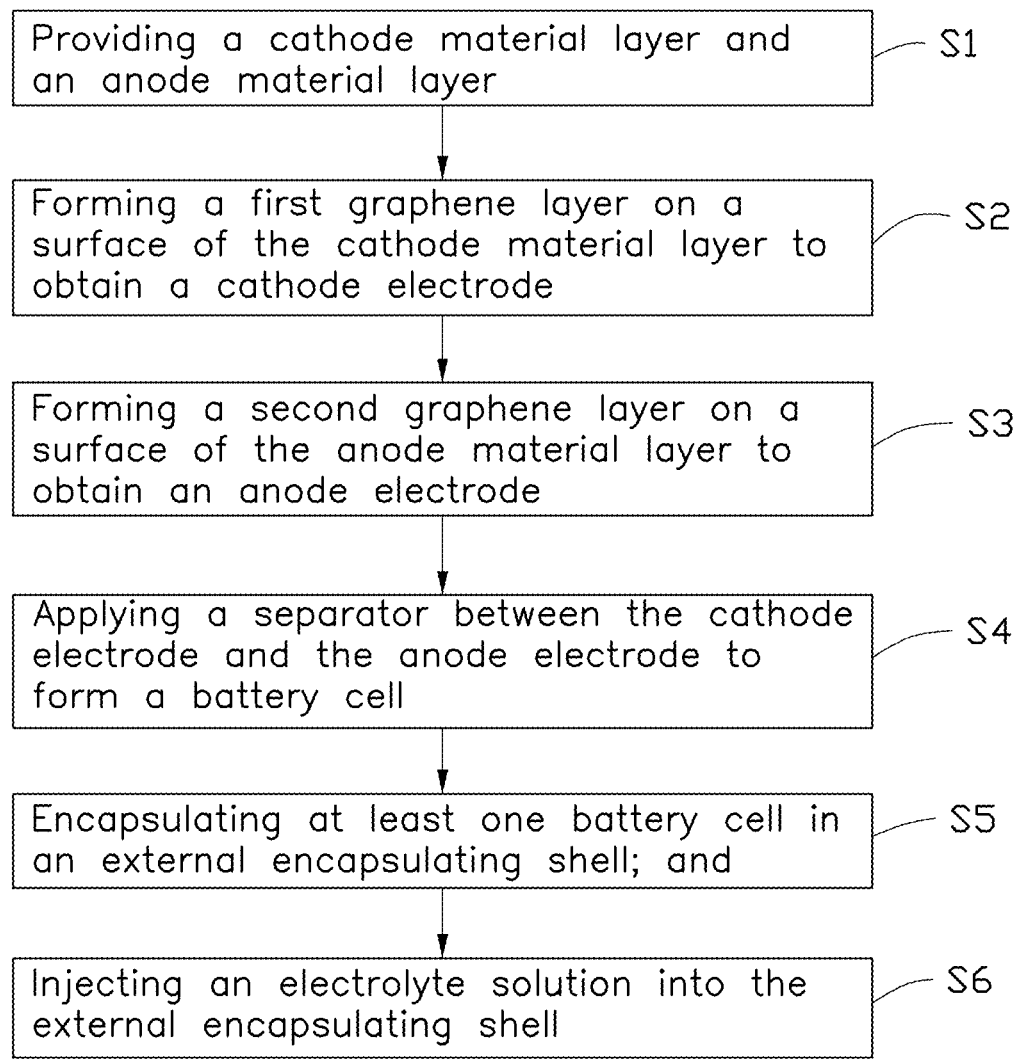
FIG. 4 is a flowchart for making a lithium ion battery according to one embodiment.

Referring to FIG. 4, a method for making a lithium ion battery is provided. The method includes the following steps:

S1: providing a cathode material layer and an anode material layer;

S2: forming a first graphene layer on a surface of the cathode material layer to obtain a cathode electrode;

S3: forming a second graphene layer on a surface of the anode material layer to obtain an anode electrode;

S4: applying a separator between the cathode electrode and the anode electrode, thereby forming a battery cell;

S5: encapsulating at least one battery cell in an external encapsulating shell; and S6: injecting an electrolyte solution into the external encapsulating shell.

In step S1, a method for making the cathode material layer is not limited. In one embodiment, the cathode material layer is formed by the following sub-steps:

S11: making a carbon nanotube source including a number of carbon nanotubes;

S12: providing a cathode active material including a number of cathode active material particles and a solvent;

S13: adding the carbon nanotube source and the cathode active material into the solvent, and shaking the solvent with the carbon nanotube source and the cathode active material with ultrasonic waves; and S14: separating the carbon nanotube source and the cathode active material from the solvent to obtain the cathode material layer.

In step S11, the carbon nanotube source can be made of carbon nanotubes. The carbon nanotubes can be single-walled carbon nanotubes, double-walled carbon nanotubes, or multi-walled carbon nanotubes. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the lengths of the carbon nanotubes are substantially the same.

A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the lithium ion battery cathode stronger. In one embodiment, the carbon nanotube array is a super aligned carbon nanotube array. A method for making the carbon nanotube array can be by CVD method, arc discharge method, aerosol method, or any other appropriate method.

In the step S12, the solvent can be ethanol, glycol, acetone, N-Methyl-2-pyrrolidone, water, or combination thereof. In one embodiment, the solvent is ethanol. The solvent is contained in a container, such as a beaker.

In the step S13, the carbon nanotube source and the cathode active material form a mixture. A weight percentage of the carbon nanotubes in the mixture can be in a range from about 0.1% to about 20%. In some embodiments, the weight percentage of the carbon nanotubes can be in a range from about 1% to about 10%. A power of the ultrasonic wave can be in a range from about 400 W to about 1500 W. In some embodiments, the power is in a range from about 800 W to about 1000 W. A time of shaking with the ultrasonic wave can range from about 2 minutes to about 30 minutes. In some embodiments, the shaking time ranges from about 5 minutes to about 10 minutes. The solvent with the carbon nanotube source and the cathode active material can be shaken with ultrasonic waves continuously or at intervals.

In step S14, after the solvent with the carbon nanotube source and the cathode active material is shaken, the carbon nanotubes in the carbon nanotube source and the cathode active material particles in the cathode active material combine with each other to form a mixture. The mixture includes or consists of the carbon nanotubes and cathode active material particles. The solvent with the mixture is kept still for about 1 minute to about 20 minutes. The mixture will deposit to a bottom of the solvent. After the solvent with the carbon nanotube source and the cathode active material is shaken, the carbon nanotubes entangled with each other to form a net structure. The cathode active material particles are wrapped by the net structure and attached on the surface of the carbon nanotubes to form an integrity mixture. The cathode active material particles have a larger density than the solvent, and as such, the integrity mixture can be deposited to the bottom of the solvent. After the mixture has deposited to the bottom of the solvent, the solvent can be absorbed from the container by a pipette, thereby separating the mixture from the solvent. After the carbon nanotube source and the cathode active material are separated from the solvent, the mixture of the carbon nanotube source and the cathode active material can be dried at a room temperature or at a temperature from about 25 degrees centigrade to about 80 degrees centigrade. After the mixture is dried, the mixture can be cut directly to form the lithium ion battery cathode. In other embodiments, the mixture can be pressed and then cut to form the lithium ion battery cathode. The cathode material layer made by the above method only consists of carbon nanotubes and cathode active material particles. The carbon nanotubes are used as conductors to improve the conductivity of the cathode material layer.

In step S1, a method for making the anode material layer is not limited. In one embodiment, the method for making the anode material layer is similar to the method for making the cathode material layer, except the anode active material is used instead of the cathode active material. The anode material layer made by the above method consists of carbon nanotubes and anode active material particles. The carbon nanotubes are used as conductors to improve the conductivity of the anode material layer.

In step S2, the first graphene layer has the same structure with the graphene layer disclosed above. A method for making the first graphene layer includes the following steps:

S21, providing a metal substrate having a surface;

S22, disposing the metal substrate in a reacting chamber;

S23, heating the metal substrate to a predetermined temperature; and

S24, supplying a carbon source gas into the reacting chamber, thereby forming the first graphene layer on the surface of the metal substrate.

In step S21, the metal substrate can be a metal foil with a thickness in a range from about 100 nanometers to about 100 micrometers. A material of the metal substrate can be copper or nickel. A shape of the metal substrate is not limited. An area of the metal substrate can be set according to the volume of the chamber used to grow the first graphene layer by the CVD method. The metal substrate can be rolled up and placed in the chamber to grow the first graphene layer with a large area. In one embodiment, the metal substrate is a copper foil with a thickness of about 25 micrometers.

In step S22, the reacting chamber can provide a reaction space for forming the first graphene layer. The reacting chamber can have a sealed cavity. The reacting chamber includes a gas inlet and a gas outlet. The gas inlet is used to input a reaction gas. The gas outlet is connected with an evacuating device. The evacuating device can be used to adjust the pressure in the reacting chamber. Furthermore, the reacting chamber can include a water cooling device to adjust the temperature in the reacting chamber. The reacting chamber can be a quartz tube furnace. An area of the metal substrate can be adjusted according to the volume of the reacting chamber. The metal substrate with a relatively large area can be bent or curved so that it can be placed in the reacting chamber.

In step S23, the surface of the metal substrate is heated to become flatter. The flatter the surface, the easier to form the first graphene layer on the surface of the metal substrate. The reacting chamber is evacuated before heating the metal substrate. In one embodiment, hydrogen gas can be imported in the reacting chamber through the gas inlet before heating the metal substrate. The hydrogen gas can reduce an oxide layer on the surface of the metal substrate, and can further prevent the metal substrate from oxidizing. A flow rate of the hydrogen gas can be in a range from about 2 standard cubic centimeters per minute (sccm) to about 35 sccm. A heating temperature can be in a range from about 800° C. to about 1500° C. A heating period can be in a range from about 20 minutes to about 60 minutes. A pressure in the reacting chamber can be in a range from about 0.1 Pa to about 100 Pa. In one embodiment, the flow rate of the hydrogen gas is about 2 sccm, the pressure of the reacting chamber is about 13.3 Pa, the heating temperature is about 1000° C., a temperature rising period is about 40 minutes, and the constant temperature period at the heating temperature is about 20 minutes.

In step S24, carbon atoms can be deposited on the surface of the metal substrate, thereby forming the first graphene layer composed of carbon atoms. The hydrogen gas is continuously imported through the gas inlet during the process of growing the first graphene layer. The flow rate of the hydrogen gas, while supplying the carbon source gas into the reacting chamber, is the same as that of the step S23. A ratio between the flow rate of the carbon source gas and the hydrogen gas is in a range from about 45:2 to about 15:2. The carbon source gas can be at least one of methane, ethane, ethylene, or acetylene. While supplying the carbon source gas, the temperature in the reacting chamber can be in a range from about 800° C. to about 1500° C. with a constant temperature period in a range from about 10 minutes to about 60 minutes. A pressure in the reacting chamber can be in a range from about $10^{-1}$ Pa to about $10^{2}$ Pa. In one embodiment, the pressure of the reacting chamber is about 66.5 Pa, the temperature of the reacting chamber is about 1000° C., the flow rate of the carbon source gas is about 25 sccm, the carbon nanotube gas is methane, and the constant temperature period is about 30 minutes.

In step S24, the metal substrate can be cooled after forming the first graphene layer thereon. While cooling the metal substrate, the carbon source gas and the hydrogen gas can continuously flow into the reacting chamber. The flow rate of the carbon source gas and the hydrogen gas and the pressure of the reacting chamber are constant. In one embodiment, the metal substrate is cooled for about 1 hour. After cooling the metal substrate, the metal substrate with the first graphene layer grown thereon is taken out of the reacting chamber. The first graphene layer can be separated from the metal substrate.

After the first graphene layer is separated from the metal substrate, the first graphene layer is attached on a surface of the cathode material layer to form the cathode electrode.

In step S3, the method of forming the second graphene layer on the surface of the anode material layer is the same as forming the first graphene layer on the cathode material layer. The second graphene layer can have the same structure as the first graphene layer.

The above step S4 can further includes the sub-step of pressing the battery cell using a laminator.

Figure 5:
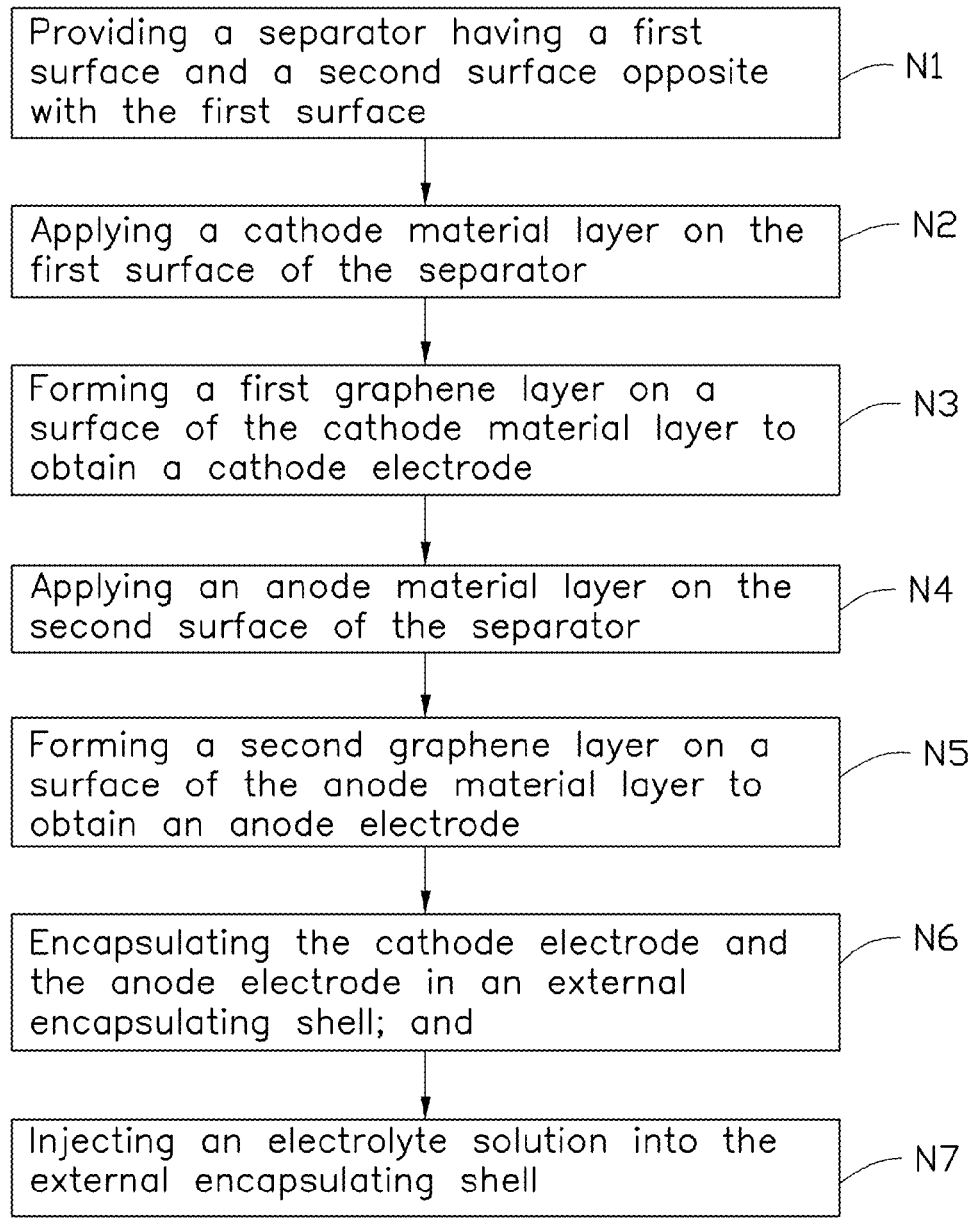
FIG. 5 is a flowchart for making a lithium ion battery according to another embodiment.

Referring to FIG. 5, another embodiment of making the lithium ion battery includes the following steps:

N1: providing a separator having a first surface and a second surface opposite to the first surface;

N2: applying a cathode material layer on the first surface of the separator;

N3: forming a first graphene layer on a surface of the cathode material layer to obtain a cathode electrode;

N4: applying an anode material layer on the second surface of the separator;

N5: forming a second graphene layer on a surface of the anode material layer to obtain an anode electrode; and N6: encapsulating the cathode electrode and the anode electrode in an external encapsulating shell; and N7: injecting an electrolyte solution into the external encapsulating shell.

In one embodiment, Step N2 includes the following sub-steps: providing slurry including cathode active material, conductive agent, and adhesive; and applying the slurry on the first surface of the separator by a coating method or spinning method. In other embodiments, the method for making the cathode material layer can be the same as step S1 disclosed above.

Step N3 is similar to step S2 disclosed above. In one embodiment, after the slurry is applied on the surface of the first surface of the separator, the first graphene layer can be formed on the surface of the cathode material layer after the slurry is solidified or before the slurry is solidified. In one embodiment, the first graphene layer is formed on the surface of the cathode material layer before the slurry is solidified, and then the slurry is solidified, so that the first graphene layer can combine with the cathode material layer tightly when the slurry is solidified.

In one embodiment, Step N4 is similar to step N2, but using anode active material instead of cathode active material. In another embodiment, the anode material layer is formed on the second surface of the separator by coating slurry including anode active material, conductive agent, and adhesive on the second surface.

Step N5 is similar to step N3. The second graphene layer can have the same structure as the first graphene layer.

Step N6 is the same as step S5 disclosed above.

Step N7 is the same as step S6 disclosed above.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A lithium ion battery comprising at least one battery cell, the at least one battery cell comprising:
   a cathode electrode comprising a cathode material layer and a cathode current collector located on a surface of the cathode material layer, the cathode current collector consisting of a single graphene, the cathode material layer consisting of a plurality of cathode active material particles and a plurality of carbon nanotubes;
   an anode electrode; and
   a separator sandwiched between the cathode electrode and the anode electrode.

2. The lithium ion battery of claim 1, wherein the plurality of carbon nanotubes are entangled with each other and combined by Van der Waals attractive force therebetween to form an integral continuous net structure having a plurality of micropores.

3. The lithium ion battery of claim 1, wherein the plurality of cathode active material particles are dispersed in the net structure and attached on the surface of the carbon nanotubes.

4. The lithium ion battery of claim 1, wherein the cathode material layer and the cathode current collector are two separate layer structures.

5. The lithium ion battery of claim 1, wherein the cathode electrode further comprises two cathode material layers and the cathode current collector, and the cathode current collector is sandwiched by the two cathode material layers.

6. The lithium ion battery of claim 1, wherein the anode electrode further comprises an anode material layer and a graphene layer stacked with the anode material layer.

7. The lithium ion battery of claim 6, wherein the anode material layer consists of a plurality of anode active material particles and a plurality of carbon nanotubes.

8. The lithium ion battery of claim 7, wherein the plurality of carbon nanotubes are entangled with each other and combined by Van der Waals attractive force therebetween to form an integral continuous net structure having a plurality of micropores.

9. The lithium ion battery of claim 1, wherein the lithium ion battery comprises a plurality of battery cells stacked with each other.

10. A lithium ion battery comprising at least one battery cell, the at least one battery cell comprising:
    a cathode electrode, the cathode electrode comprises a cathode material layer and a cathode current collector stacked with the cathode material layer, the cathode material layer consisting of a plurality of cathode active material particles and a plurality of carbon nanotubes;
    an anode electrode, the anode electrode comprises an anode material layer and an anode current collector located on a surface of the anode material layer, the anode current collector consisting of a single graphene; and
    a separator sandwiched between the cathode material layer and the anode material layer.

11. The lithium ion battery of claim 10, wherein the cathode electrode comprises two cathode material layers and one cathode current collector, and the cathode current collector is sandwiched by the two cathode material layers.

12. The lithium ion battery of claim 10, wherein the anode electrode comprises two anode material layers and one anode current collector, and the anode current collector is sandwiched between the two anode material layers.

13. The lithium ion battery of claim 12, wherein the anode material layer consists of a plurality of anode active material particles and a plurality of carbon nanotubes.

14. The lithium ion battery of claim 1, wherein the cathode material layer is located between the separator and the cathode current collector.

15. The lithium ion battery of claim 1, wherein the cathode active material particles and the plurality of carbon nanotubes fixed together by van der Waals attractive force therebetween.

16. The lithium ion battery of claim 1, wherein a length of the plurality of carbon nanotubes is longer than 200 micrometers.

17. The lithium ion battery of claim 16, wherein the plurality of carbon nanotubes are entangled with each other and combined by van der Waals attractive force therebetween to form an integral continuous net structure having a plurality of micropores.

18. The lithium ion battery of claim 17, wherein the plurality of cathode active material particles are dispersed in the net structure and attached on the surface of the plurality of carbon nanotubes.

* * * * *